United States Patent [19]

Washio et al.

[11] Patent Number: 6,054,520

[45] Date of Patent: Apr. 25, 2000

[54] HEAT CONDUCTIVE BN FILLER AND ELECTRICALLY INSULATING/HEAT DISSIPATING SHEET

[75] Inventors: Tomokazu Washio, Annaka; Tokio Sekiya; Takehide Okami, both of Gunma-ken, all of Japan

[73] Assignee: Shin-Etsu Chemical Co., Ltd., Tokyo, Japan

[21] Appl. No.: 09/128,253

[22] Filed: Aug. 3, 1998

[30] Foreign Application Priority Data

Aug. 4, 1997 [JP] Japan ................................. 9-222004

[51] Int. Cl.⁷ ....................................................... C08K 3/38
[52] U.S. Cl. ........................... 524/404; 524/495; 501/96.4
[58] Field of Search ..................... 524/404, 495; 501/96.4

[56] References Cited

U.S. PATENT DOCUMENTS

| | | | |
|---|---|---|---|
| 4,292,225 | 9/1981 | Theodore et al. | 524/268 |
| 4,853,196 | 8/1989 | Koshida et al. | 423/290 |
| 4,927,587 | 5/1990 | Takahashi et al. | 524/404 |

OTHER PUBLICATIONS

Pukanszky et al., Advances in Polymer Science: Mineral Fillers in Thermoplastics I, Springer, 1999.

*Primary Examiner*—David W. Wu
*Assistant Examiner*—Ling-Siu Choi
*Attorney, Agent, or Firm*—McAulay Nissen Goldberg Kiel & Hand, LLP

[57] ABSTRACT

A heat conductive BN filler having a cohesive factor of 3–50% is provided. An electrically insulating/heat dissipating sheet is obtained by mixing the BN filler with an organopolysiloxane and a crosslinking agent, shaping the resulting silicone rubber composition into a sheet form, followed by vulcanization. Without special orienting means, the BN particles are oriented in the sheeting step such that their a-axis is perpendicular to the sheet surface.

6 Claims, No Drawings

HEAT CONDUCTIVE BN FILLER AND ELECTRICALLY INSULATING/HEAT DISSIPATING SHEET

BACKGROUND OF THE INVENTION

1. Field of the Invention

This invention relates to a heat conductive boron nitride filler and an electrically insulating/heat dissipating sheet using the same.

2. Background Art

Electrically insulating/heat dissipating sheets are generally prepared by mixing an organopolysiloxane, a heat conductive inorganic powder and a crosslinking agent, and shaping the resulting silicone rubber composition into a sheet form, followed by vulcanization. They are used for the electrical insulation and heat dissipation of heat-generating electronic parts such as power transistors and thyristors. Exemplary of the heat conductive inorganic powder are hexagonal boron nitride (often abbreviated as BN, hereinafter), alumina, beryllia and diamond. Of these, BN is most preferable when a total profile of properties, cost and safety is taken into account. However, BN particles are of a layered crystal structure and have a tabular shape. The heat transfer of tabular BN particles largely differs with direction. Illustratively, the heat transfer in a direction parallel to the layer (referred to as a-axis direction, hereinafter) is higher than the heat transfer in a direction perpendicular to the layer (referred to as c-axis direction, hereinafter) by a factor of about 30. Therefore, in order to improve the heat transfer of electrically insulating/heat dissipating sheets in the thickness direction, tabular particles of BN are preferably distributed such that their a-axis is aligned in the thickness direction of the sheet. However, the electrically insulating/heat dissipating sheets must be finished to a smooth surface for ensuring close contact with heat-generating electronic parts and heat sink fins. In a common practice used to this end, a silicone rubber composition loaded with BN powder is formed into a sheet, followed by press vulcanization. In the sheeting step, BN particles tend to orient parallel to the sheet surface. Since the heat-dissipating route of the sheet is given in the c-axis direction of BN particles, this orientation means that the sheet fails to take advantage of the enhanced heat transfer of BN.

Thus, various attempts were made in the art for orienting BN particles such that their a-axis is aligned perpendicular to the sheet surface. For example, JP-A 244094/1996 discloses a method involving extrusion molding a kneaded compound into a plurality of plasticized bands, and integrating them with the aid of lips. In JP-B 38460/1994, a once press molded sheet is cut into bands, and one band is joined to a 90° rotated band to form a sheet. Either of these methods requires extra steps or installations, which are disadvantageous from the standpoints of productivity and cost.

SUMMARY OF THE INVENTION

Therefore, an object of the present invention is to provide a heat conductive BN filler which ensures that the majority of BN particles are oriented such that their a-axis is aligned in the thickness direction of a sheet when a silicone rubber compound loaded with BN particles is sheeted. Another object of the present invention is to provide an electrically insulating/heat dissipating sheet containing the heat conductive BN filler.

The invention provides a heat conductive BN filler having a cohesive factor of 3 to 50%. Preferably, the heat conductive BN filler has a specific surface area of up to 10 $m^2/g$, a purity of at least 95% by weight, and a crystallite size of at least 500 Å.

An electrically insulating/heat dissipating sheet is prepared by mixing BN particles with a silicone rubber compound, followed by sheeting and vulcanization in a conventional manner. When the BN particles have the specific cohesive factor, a relatively large proportion of BN particles are oriented such that their a-axis is aligned perpendicular to the sheet surface, that is, aligned in the thickness direction of the sheet. Then an effective heat dissipating route is given in the thickness direction of the sheet.

In a second aspect, the invention provides an electrically insulating/heat dissipating sheet which is obtained by shaping a silicone rubber composition comprising an organopolysiloxane, the heat conductive BN filler and a crosslinking agent into a sheet form, followed by vulcanization.

DETAILED DESCRIPTION OF THE INVENTION

According to the invention, the heat conductive BN filler has a cohesive factor of 3 to 50%. The cohesive factor is a physical value which is measured by a powder tester, for example, PT-N by Hosokawa Micron K. K. The cohesive factor is 0% when particles do not agglomerate at all and are completely dispersed as primary particles. The cohesive factor increases as more particles agglomerate. Insofar as the cohesive factor falls in the range of 3 to 50%, the agglomerate may take the form of natural agglomerates caused by van der Waals forces, electrostatic forces, adsorbed moisture or the like, artificial agglomerates intentionally agglomerated by mixing granulation, extrusion granulation, or spray drying, or aggregates bound by incidental impurities such as $B_2O_3$ at grain boundaries. If the cohesive factor is less than 3%, the tendency of BN particles to orient their a-axis in the heat dissipating route of the sheet becomes weaker. A cohesive factor of more than 50% extremely exacerbates the dispersion of BN particles in silicon rubber compounds, leaving the risk that sheet shaping becomes ineffective or the sheet surface becomes irregular. For this reason, the cohesive factor of the BN filler should fall in the range of 3 to 50%, preferably 10 to 20%.

Preferably, primary particles of the BN filler have a mean particle size of about 1 to 30 $\mu$m, more preferably about 5 to 20 $\mu$m. With a mean particle size of less than 1 $\mu$m, the number of grain boundaries in the heat dissipating route becomes too much to provide sufficient heat transfer. Particles with a mean particle size of more than 30 $\mu$m would be not only difficult to agglomerate spontaneously, but also difficult to agglomerate by artificial means, and thus difficult to reach a cohesive factor of 3% or higher. Agglomerated particles should preferably have a secondary particle size of less than 70% of the sheet thickness. With a size of more than 70% of the sheet thickness, the sheet cannot be finished to a smooth surface and would thus come in poor contact with heat-generating electronic parts and heat sink fins.

It is also preferred that surfaces of BN particles be smooth enough to provide intimate contact with silicone rubber compositions. In this regard, the BN filler should preferably have a specific surface area of up to 10 $m^2/g$, more preferably up to 5 $m^2/g$ as measured by the BET method.

Further, the BN filler preferably has a purity of at least 95% by weight, more preferably at least 98% by weight. A purity of less than 95% by weight would leave a room for impurities to have an influence of exacerbating heat transfer and electrical insulation.

It is further preferred that crystallization has well developed in the BN filler. The BN filler preferably has a crystallite size of at least 500 Å, more preferably at least 700 Å, as measured by the method of the Carbon Material 117 Committee in the Japan Society for the Promotion of Science. With a crystallite size of less than 500 Å, the crystal structure of BN would become amorphous, failing to provide desired characteristics.

The BN filler having a cohesive factor in the range of 3 to 50% and other physical properties in the above preferred ranges has the advantage that when a rubber compound loaded with the BN filler is shaped into an electrically insulating/heat dissipating sheet, a more number of BN particles are oriented such that their a-axis is aligned perpendicular to the sheet surface. The BN filler thus contributes to the increased heat transfer through the heat dissipating route of the electrically insulating/heat dissipating sheet in the thickness direction thereof.

Now, the electrically insulating/heat dissipating sheet containing the BN filler is described.

The base material of the electrically insulating/heat dissipating sheet in which the BN filler of the invention is incorporated is not critical. A variety of rubbers are useful although silicone rubber is preferable. Preferably the electrically insulating/heat dissipating sheet is obtained by shaping a silicone rubber composition into a sheet form and vulcanizing it. The silicone rubber composition used herein comprises (A) an organopoly-siloxane, (B) the BN filler described above, and (C) a crosslinking agent as essential components. These components are described below.

Component (A) of the silicone rubber composition is an organopolysiloxane of the following average unit formula (1):

$$R_a SiO_{(4-a)/2} \quad (1)$$

wherein R is a monovalent hydrocarbon group and letter a is a positive number of 1.85 to 2.10.

In formula (1), R represents identical or different, substituted or unsubstituted, monovalent hydrocarbon groups, preferably having 1 to 12 carbon atoms, more preferably 1 to 10 carbon atoms, for example, alkyl groups such as methyl, ethyl and propyl, alkenyl groups such as vinyl, allyl and butenyl, aryl groups such as phenyl and tolyl, cycloalkyl groups such as cyclohexyl, and substituted ones of these groups wherein some or all of the hydrogen atoms directly attached to carbon atoms are replaced by halogen atoms or cyano, such as chloromethyl, trifluoropropyl and cyanoethyl. Preferably, the organo-polysiloxane has a linear molecular structure although the partial inclusion of a branched structure in a molecule is acceptable. Further preferably, the organopolysiloxane is end-blocked with a triorganosilyl or hydroxyl group. Exemplary triorganosilyl groups are trimethylsilyl, dimethylvinylsilyl, trivinylsilyl, methylphenylvinylsilyl and methyldiphenylsilyl. The degree of polymerization of the organopolysiloxane is not particularly limited although a degree of polymerization giving a viscosity of at least 25 centistokes at 25° C., especially at least 5,000 centistokes at 25° C. is preferred.

The BN filler having a cohesive factor of 3 to 50% serves as component (B) for improving the heat transfer of the electrically insulating/heat dissipating sheet while maintaining the electrical insulation thereof.

The amount of the BN filler blended as component (B) is 30 to 500 parts, preferably 100 to 300 parts by weight per 100 parts by weight of the organopolysiloxane as component (A). On this basis, less than 30 parts of the BN filler fails to provide sufficient heat transfer. With more than 500 parts of the BN filler, it is difficult to uniformly disperse such a large amount of filler in the silicone rubber composition or the composition becomes too viscous to shape into sheets.

The crosslinking agent as component (C) is selected as appropriate depending on the mechanism of crosslinking reaction of the organopolysiloxane as component (A). In the event of crosslinking by radical reaction, organic peroxides are used. Examples include benzoyl peroxide, 2,4-dichlorobenzoyl peroxide, o-methylbenzoyl peroxide, p-methylbenzoyl peroxide, dicumyl peroxide, di(t-butyl)-perbenzoate, 2,5-dimethyl-2,5-bis(t-butylperoxy)hexane, and di(t-butyl) peroxide. In the event of crosslinking by addition reaction, there are used an organohydrogensiloxane having at least two hydrogen atoms each directly attached to a silicon atom in a molecule and a catalytic amount of platinum or platinum compound as an addition reaction catalyst. In this event, the organopolysiloxane as component (A) should contain at least two alkenyl groups in a molecule. In the event of crosslinking by condensation reaction, a hydrolyzable silane or siloxane and an organometallic compound such as a tin or titanium compound are used. In this event, the organopolysiloxane as component (A) should be blocked with a hydroxyl group at either end of its molecular chain.

The amount of the crosslinking agent blended as component (C) is determined as appropriate in accordance with the type and blending ratio of other components although it is usually about 0.1 to 10% by weight of the entire composition.

According to the invention, an electrically insulating/heat dissipating sheet is obtained by kneading a silicone rubber composition comprising at least three components (A), (B) and (C) in a universal mixer such as a planetary mixer, gate mixer, Shinagawa mixer, Banbury mixer or three-roll mill, shaping the composition into a sheet form using a doctor blade, calender roll or extrusion molding machine, and curing the sheet under appropriate conditions corresponding to the selected one of the above-mentioned vulcanizing systems.

In the silicone rubber composition, there may be blended other ingredients in addition to components (A), (B) and (C). Such useful ingredients are reinforcing fillers such as silica flour; dispersants such as low-molecular weight siloxanes having a degree of polymerization of less than 100, cyclic siloxanes, silaneol-bearing silanes and alkoxy-bearing silanes; flame retardant assistants such as platinum compounds and palladium compounds, heat resistance modifiers such as iron oxide, cerium oxide and octyl oxide; organic solvents for dilution; pigments for coloring; and curing inhibitors used in the event of crosslinking by addition reaction such as acetylene alcohol, triazole and vinyl-bearing cyclic siloxane. It is also useful to use glass fiber cloth serving as a skeleton for a sheet during sheet formation. It is also acceptable to carry out surface modification on the BN filler as component (B) with various silane coupling agents and silylating agents for the purpose of improving the affinity to and dispersibility in the organopolysiloxane as component (A). These measures are taken as long as the benefits of the invention are not lost.

If desired, the electrically insulating/heat dissipating sheet is provided with an adhesive and a release paper so that it is ready for joint to heat-generating electronic parts.

In this way, there is obtained an electrically insulating/heat dissipating sheet featuring effective heat transfer.

It is noted that the heat conductive BN filler of the invention can also be used in other applications where heat transfer is required, for example, as room temperature-vulcanizable heat dissipating sealants and semiconductor device encapsulating agents.

According to the invention, when an ordinary silicone rubber composition is loaded with the BN particles, sheeted and cured, the BN particles are oriented in the sheeting step such that their a-axis is aligned perpendicular to the sheet surface, without a need for special orienting means. An electrically insulating/heat dissipating sheet featuring effective heat transfer is obtained by a simplified process and at a low cost.

EXAMPLE

Examples are given below together with comparative examples to illustrate the invention, and are not intended to limit the scope thereof. All parts are by weight.

Example 1

A silicone rubber composition was prepared by dispersing 100 parts of an organopolysiloxane consisting of 99.85 mol % of dimethylsiloxane units and 0.15 mol % of methylvinylsiloxane units and having an average degree of polymerization of about 8,000, 175 parts of a BN powder having a cohesive factor of 3.5%, a purity of 99.5% by weight, a mean particle size of 10 μm, and a crystallite size of greater than 1000 Å, and 1.5 parts of a crosslinking agent, 2,5-dimethyl-2,5-bis(t-butylperoxy)hexane in 300 parts of toluene and mixing the dispersion in a planetary mixer for 1 hour. The silicone rubber composition was applied to both the surfaces of a glass fiber cloth by means of a doctor blade to a thickness of 0.25 mm, dried for 20 minutes at 80° C., and subjected to heat/press vulcanization at a temperature of 170° C. and a pressure of 100 kg/cm$^2$ for 10 minutes, yielding an electrically insulating/heat dissipating sheet. The sheet was subject to secondary vulcanization at 200° C. and atmospheric pressure for 4 hours and then cooled. The sheet was measured for thermal resistance by means of a TO-3 type transistor. The sheet was also examined for x-ray diffraction by illuminating x-rays perpendicular to the sheet surface. A degree of orientation was computed from a peak intensity ratio of (002)/(100).

Example 2

Using a BN powder having a cohesive factor of 11.5%, an electrically insulating/heat dissipating sheet was prepared and examined as in Example 1.

Example 3

Using a BN powder having a cohesive factor of 30.1%, an electrically insulating/heat dissipating sheet was prepared and examined as in Example 1.

Example 4

Using a BN powder having a cohesive factor of 38.6%, an electrically insulating/heat dissipating sheet was prepared and examined as in Example 1.

Example 5

Using a BN powder having a cohesive factor of 47.3%, an electrically insulating/heat dissipating sheet was prepared and examined as in Example 1.

Comparative Example 1

Using a BN powder having a cohesive factor of 0.6%, an electrically insulating/heat dissipating sheet was prepared and examined as in Example 1.

Comparative Example 2

Using a BN powder having a cohesive factor of 2.3%, an electrically insulating/heat dissipating sheet was prepared and examined as in Example 1.

Comparative Example 3

An attempt was made to prepare an electrically insulating/heat dissipating sheet as in Example 1, using a BN powder having a cohesive factor of 57.4%. The BN powder was poorly dispersed in the silicone rubber composition, resulting in the composition increasing its viscosity and becoming difficult to form a sheet. This attempt failed.

The results are shown in Table 1.

TABLE 1

|  | Cohesive factor (%) | Thermal resistance (° C/W) | Degree of orientation |
| --- | --- | --- | --- |
| E1 | 3.5 | 0.18 | 28.1 |
| E2 | 11.5 | 0.14 | 23.3 |
| E3 | 30.1 | 0.13 | 21.3 |
| E4 | 38.6 | 0.12 | 17.4 |
| E5 | 47.3 | 0.10 | 12.6 |
| CE1 | 0.6 | 0.29 | 72.4 |
| CE2 | 2.3 | 0.27 | 35.8 |
| CE3 | 57.4 | sheet formation failed | |

Note that the BN powders used in the foregoing Examples and Comparative Examples were obtained from an identical lot of BN powder by sieving such that a fraction having a certain cohesive factor was collected. Therefore, the physical properties of powder other than the cohesive factor are all the same as in Example 1.

It is evident from Table 1 that as compared with the sheets of Comparative Examples falling outside the scope of the invention, the sheets of Examples falling within the scope of the invention have a low thermal resistance and hence, good heat dissipation. The degrees of orientation as determined by x-ray diffraction show that in the sheets of Examples, the heat dissipating route is in register with the a-axis direction of BN particles. In Comparative Example 3 using a BN powder having a too high cohesive factor, a sheet could not be formed. These results demonstrate the effectiveness of the invention.

Japanese Patent Application No. 222004/1997 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An electrically insulating/heat dissipating sheet which is obtained by shaping a silicone rubber composition into a sheet form, followed by vulcanization, said silicone rubber composition comprising:

(A) 100 parts by weight of an organopolysiloxiane of the following average unit formula (1):

$$R_a SiO_{(4-a)/2} \tag{1}$$

wherein R is a monovalent hydrocarbon group and letter a is a positive number of 1.85 to 2.10, (B) 30 to 500 parts by weight of the heat conductive boron nitride filler having a cohesive factor of 3 to 50%, and (C) a crosslinking agent.

2. The electrically insulating/heat dissipating sheet of claim 1, wherein the heat conductive boron nitride filler has a specific surface area of up to 10 m²/g, a purity of at least 95% by weight, and a crystallite size of at least 500 Å.

3. The electrically insulating/heat dissipating sheet of claim 1, having a degree of orientation computed from a peak intensity ratio of (002)/(100) of 12.6 to 28.1.

4. A method of aligning a-axis of a heat conductive boron nitride filler perpendicular to a sheet surface in an electrically insulating/heat dissipating sheet, the method comprising:

shaping a silicone rubber composition into a sheet form, followed by vulcanization;

said silicone rubber composition comprising:

(A) 100 parts by weight of an organopolysiloxane of the following average unit formula (1):

$$R_aSiO_{(4-a)/2} \quad (1)$$

wherein R is a monovalent hydrocarbon group and letter a is a positive number of 1.85 to 2.10, (B) 30 to 500 parts by weight of the heat conductive boron nitride filler having a cohesive factor of 3 to 50%, and (C) a crosslinking agent.

5. The method of aligning a-axis of a heat conductive boron nitride filler perpendicular to a sheet surface in an electrically insulating/heat dissipating sheet according to claim 4, wherein the heat conductive boron nitride filler has a specific surface area of up to 10 m²/g, a purity of at least 95% by weight, and a crystallite size of at least 500 Å.

6. The method of aligning a-axis of a heat conductive boron nitride filler perpendicular to a sheet surface in an electrically insulating/heat dissipating sheet according to claim 4, wherein the electrically insulating/heat dissipating sheet has a degree of orientation computed from a peak intensity ratio of (002)/(100) of 12.6 to 28.1.

* * * * *